June 7, 1955     J. H. CLAUSON     2,709,985

SALT BRICK HOLDER FOR CAGES

Filed Oct. 20, 1953

INVENTOR.
JAMES H. CLAUSON
BY George R. Bliss
Attorney

United States Patent Office 2,709,985
Patented June 7, 1955

2,709,985

SALT BRICK HOLDER FOR CAGES

James H. Clauson, Tujunga, Calif.

Application October 20, 1953, Serial No. 387,227

5 Claims. (Cl. 119—18)

This invention relates to a salt brick holder and particularly to a salt brick holder for use in mounting salt bricks in cages or enclosures for confining rabbits, chinchillas and other small livestock or domesticated animals.

Ordinary salt either in its pure form or in a medicated composition is often an essential part of the diet of such animals. It is usually compressed into small bricks from which the animals may consume small portions as they need it. If not supplied in hard compressed bricks, the animals may eat unduly large portions at a time with harmful and possibly fatal results. These bricks have been customarily placed upon the floor of the cage or have been suspended from some upper part of the cage. As prepared by the manufacturer and supplied to the animal husbandman, the bricks are usually in the form of a disk of circular or other configuration with a central bore. Through this bore it has been customary to pass a wire, the free ends of which are attached to the sidewall of the cage or some appurtenance of the cage. Other types of suspending supports have also been used.

Several disadvantages are associated with the present method of supplying the salt brick to the animals. If placed on the floor, they may become softened by drinking water from the drinking supply afforded the animals, or from urine or other liquid. The bricks when thus softened may be eaten in excessive amounts to the detriment of the animals as above noted. If the brick is accidentally released from a support of the kind above noted, either because of failure of the support to function properly, or due to uneven nibbling of the brick by the animals with the result that it is released from the holder before it has been completely consumed, or nearly so, this same result of softening of the brick upon the floor of the cage also occurs. The cages are usually made from heavy metal wire some of which at least is arranged vertically in the side walls of the cage. The salt bricks if hung so as to contact these wires, due to the deliquescent nature of the salt material, develops a surface moisture which tends to corrode the wire. This corrosion if it continues for an extended period of time may weaken or destroy the wire. The animals, being rodents, gnaw the salt brick which may in this manner be pushed upwardly or sidewise in a manner to prevent an effective gnawing by the teeth of the animal and may also dislodge the brick holder from its cage support, permitting it to drop to the floor of the cage.

It is the object of this invention to eliminate these disadvantages and to provide a holder which is inexpensive of manufacture, which may quickly be attached or detached to the cage wall, and which will support the bricks in stationary position, and afford a backing for it in opposition to the gnawing thrust of the animal in every direction in which that thrust may be exerted. The invention, of course, may take various forms of embodiment without departure from the essential nature of the invention.

In the drawings and specification one such embodiment is shown, but it is understood that the invention may take other forms and yet come within the descriptive language of the appended claims.

Figure 1:
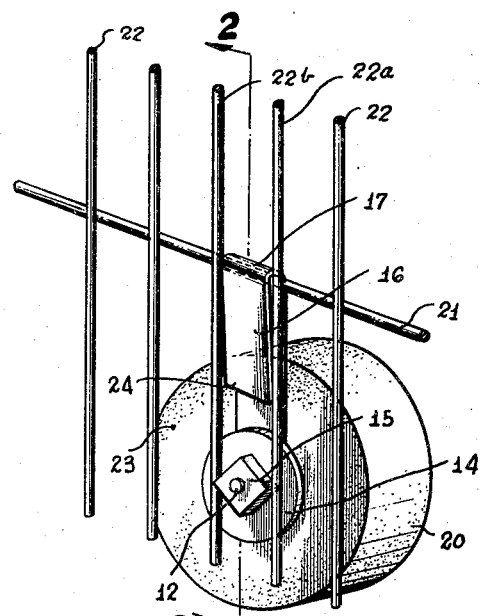
Fig. 1 is a perspective view of a salt brick holder, of the salt brick held thereby, and of a portion of the sidewall of a cage to which the holder is secured.
Figure 3:
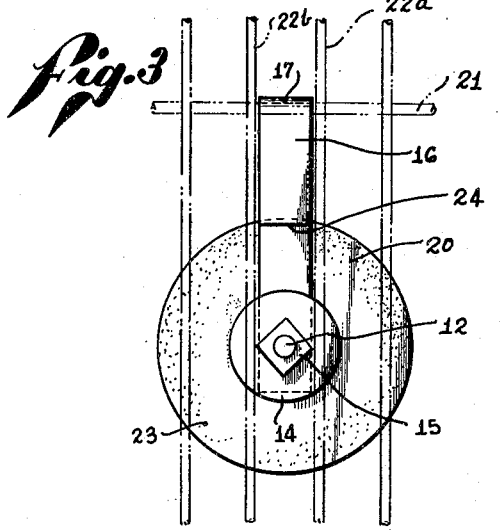
Fig. 3 is a front elevational view of the holder, brick and cage parts.
Figure 2:
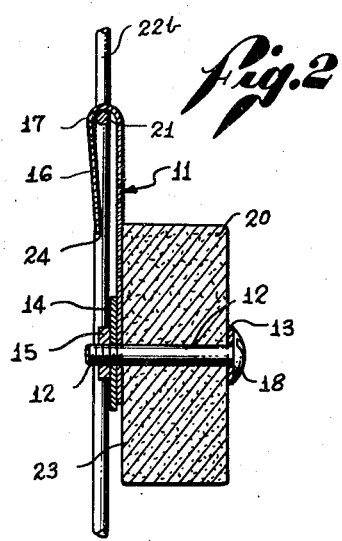
Fig. 2 is a vertical sectional view of the holder, salt brick and cage elements shown in Fig. 1 taken along the line 2—2 of Fig. 1.

The holder comprises a hanger 11, a screwheaded bolt 12, a small washer 13, a larger washer 14, and a retaining nut 15. The hanger 11 is formed with an upper hooked end 16 provided by bending the end 16 back upon the main length of the hanger to form a loop 17 of small curvature radius. The end 16 is bent toward the main length of the hanger 11 slightly beyond a position of parallelism with the main length of the hanger.

A salt brick 20, preferably a circular disk, has a central bore of a diameter such that the shank of the bolt 12 snugly fits therein. In assembling the brick 20 upon the holder, the small washer 13 is first placed in position upon the bolt 12 against the screwhead 18 of the bolt, the salt brick 20 is next threaded upon the bolt 12, and then upon the outer threaded end 19 of the bolt 12 are successively placed the lower end of the hanger 11 which is centrally apertured to fit over the bolt, the large washer 14, and lastly the retaining nut 15 which it turned inwardly upon the threaded end 19 of the bolt sufficiently to tightly clamp the salt brick 20 between the washer 13 and 14 of the holder assembly. The assembled holder and salt brick 20 are then placed in position upon a cage wall consisting for example of horizontal wires represented by the wire 21 and a plurality of vertical wires 32, the two of which immediately adjacent the salt brick and holder are designated by the numerals 22a and 22b. The assembled brick and holder are inserted in the interior of the cage with the holder 12 in vertical position and the salt brick at the lower end of the assembly, and with the slot opening 24 between the lower end of the hooked end 16 of the hanger 11 and the primary arm 25 of the hanger, adjacently above a crosswire 21. The assembly is then moved downwardly, the wire 21 moving upwardly relative to the holder until the holder and salt brick assume the position shown in the figures of the drawing.

In this position, the large washer 14, the diameter of which is greater than the span between adjoining vertical wires 22a and 22b, rests against the inner sides of these wires, thereby spacing the outer face 23 of the salt brick away from the wires preventing moisture on the salt brick from corroding the surface of the wires. The opening 24 which is just sufficiently wide to pass over the wire 21 in assembling the holder and brick in the cage, may be made even narrower by slightly bending the hooked end 16 toward the primary arm 25. Whether or not thus additionally bent backward, it is apparent that it is difficult if not impossible for the animal gnawing at the bottom of the salt brick 20 to elevate it and the holder sufficiently to detach the holder from the wire.

The center of gravity of the salt brick being within the cage, as it hangs in its position in the cage, the washer 14 is urged outwardly by gravity around the wire 21 as a center, seating the washer 14 solidly against the wires 22a and 22b. Any force exerted by the animals outwardly in an axial direction upon the brick is resisted by the wires 22a and 22b. Since the animals cannot get to the outer surface 23 of the brick, there is no need to provide for resistance to an axial thrust on the brick inwardly of the cage. Thrust applied to the brick by the animals in a horizontal or near horizontal direction in a plane approximating parallelism with the sidewall wires of the cage, is resisted by contact of the nut 15 with the wires 22a and 22b on either side of it respectively, the nut being large enough to contact these wires, before the holder and brick can move laterally to any considerable extent. The strip of metal forming the hanger 11 may also be sufficiently wide so that the ends of the loop 17 prevent any considerable movement along the wire 21 before they contact the vertical wires 22a and 22b respectively.

I have thus provided a salt brick hanger which when associated with a suitably shaped salt brick will support the brick above the floor in a secure fashion, which may be readily assembled, attached to the cage and detached therefrom, which will protect the brick from contact with any metal of the cage, which will resist the thrust of the animal in any direction in which it may possibly be applied, and which is inexpensive to manufacture, neat in appearance and sturdy in construction. Since some of these rodent animals, such as chinchillas, jump freely about the cage from wall to wall and floor to wall, jumping with great force and subjecting the cage and the appurtenances thereto and all movable objects therein to considerable relative movement, resulting either from the vibration of the cage or from the impact of the bodies of the animal, the salt brick holder and suitably formed brick mounted thereon of this invention will be practically completely free from possibility of dislodgement of the holder and brick, of any rubbing of the brick against the cage wires, and of any undue chafing of the parts of the holder against the cage wires.

It will be noted that partially due to the shape of the salt brick, and partially due to the small dimensions of the holder parts, the side faces of the brick are almost fully exposed, and the rim surface is fully exposed, to the animals. As a result it has been found in practice in the use of a holder constructed in accordance with this invention, the circular lateral dimensions of the brick will decrease evenly toward the central axis of the brick as it is being used in the cage and after almost complete consumption of the brick, the very small ring surrounding the pin may be removed by the attendant before it falls to the floor of the cage. Thus without endangering the safety of the animals, economy of the salt brick material and economy of time of the attendant is realized.

I claim:

1. A device for confining animals and supplying salt thereto, comprising: a cage having vertical wires spaced at given horizontal intervals, and horizontal wires; a hanger shaped at its upper end to engage a horizontal cage wire; a horizontal pin attached to the hanger at the lower end thereof, and projecting inwardly from the upright plane of the hanger for a distance sufficient to be seated in a central bore of a salt brick; a clamping washer at the hanger end of the pin of a relatively large diameter sufficient to more than span the said horizontal intervals between a pair of adjacent vertical cage wires; a header means at the other end of the pin of a larger diameter than the pin; and means for drawing the washer and header means tightly against a salt brick mounted on a pin between the washer and header means.

2. The device as defined in claim 1, in which the hanger end of the pin is threaded and the drawing means includes a nut threaded thereon and disposed longitudinally inside the large washer, of an overall span less than the said horizontal interval between a pair of adjacent cage wires.

3. The device as defined in claim 1, in which the hanger is a length of substantially wide strap metal, bent back upon itself slightly more than 180° to provide a loop at its upper end.

4. The device defined in claim 3, in which the width of the strap metal hanger is less than the interval between a pair of vertical cage wires.

5. A device for confining animals and supplying salt thereto, comprising: a cage having vertical wires placed at a given horizontal interval; a pin of a diameter to fit snugly within a bore in the brick, said pin being threaded at its outer end and formed with a screwhead at its inner end; a hanger of wide flat strap metal narrower than the said interval and apertured at its lower end to receive the pin, the lower end being capable of assembly flat against the outer face of a salt brick on the pin between the said lower end and the screwhead; a washer of a diameter larger than said interval, disposed axially on the side of the lower end of the hanger remote from the position of the salt brick on the pin; and a nut beyond the washer engaging said threaded outer end of the pin for clamping the salt brick tightly between the screwhead and the washer, the nut having an overall width less than the said interval.

References Cited in the file of this patent

UNITED STATES PATENTS

| | | |
|---|---|---|
| 198,846 | Hendryx | Jan. 1, 1878 |
| 1,009,361 | Weil | Nov. 21, 1911 |
| 1,785,858 | Davis | Dec. 23, 1930 |
| 1,909,244 | Ahlman | May 16, 1933 |
| 2,142,825 | Patten | Jan. 3, 1939 |
| 2,228,574 | Lowe | Jan. 14, 1941 |